US012574310B2

(12) United States Patent
Hulick et al.

(10) Patent No.: US 12,574,310 B2
(45) Date of Patent: Mar. 10, 2026

(54) OPEN TELEMETRY ENABLED NETWORK DEVICE MANAGEMENT

(71) Applicant: Cisco Technology, Inc., San Jose, CA (US)

(72) Inventors: Ted Hulick, Pearland, TX (US); Thomas Szigeti, Vancouver (CA); David John Zacks, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 29 days.

(21) Appl. No.: 18/799,215

(22) Filed: Aug. 9, 2024

(65) Prior Publication Data

US 2026/0046231 A1    Feb. 12, 2026

(51) Int. Cl.
| | |
|---|---|
| *G06F 15/16* | (2006.01) |
| *G06F 9/54* | (2006.01) |
| *H04L 29/06* | (2006.01) |
| *H04L 43/062* | (2022.01) |
| *H04L 43/10* | (2022.01) |

(52) U.S. Cl.
CPC ............ *H04L 43/10* (2013.01); *H04L 43/062* (2013.01)

(58) Field of Classification Search
CPC .............................. H04L 43/10; H04L 43/062
USPC ........................................................ 709/224
See application file for complete search history.

(56) References Cited

U.S. PATENT DOCUMENTS

| | | | | | |
|---|---|---|---|---|---|
| 11,848,837 | B2 * | 12/2023 | Levy | ..................... | H04L 67/025 |
| 12,231,317 | B2 * | 2/2025 | Lorga | ................. | H04L 41/0681 |
| 2022/0417117 | A1 | 12/2022 | Tayeb et al. | | |
| 2023/0118838 | A1 * | 4/2023 | Hulick, Jr. | .......... | G06F 9/44521 |
| | | | | | 719/331 |
| 2023/0164041 | A1 * | 5/2023 | Marshall | ................ | H04L 41/40 |
| | | | | | 709/224 |
| 2023/0318911 | A1 | 10/2023 | Hendrey et al. | | |
| 2023/0409369 | A1 | 12/2023 | Liu et al. | | |
| 2024/0419581 | A1 * | 12/2024 | Eizenman | ........... | G06F 11/3688 |
| 2025/0062949 | A1 * | 2/2025 | Nimmagadda | ....... | H04L 41/046 |
| 2025/0202810 | A1 * | 6/2025 | Sampaio Junior | ...... | H04L 67/56 |

(Continued)

FOREIGN PATENT DOCUMENTS

| | | | | | |
|---|---|---|---|---|---|
| CN | 112689977 | A * | 4/2021 | ............... | H04Q 9/00 |
| CN | 110445643 | B * | 11/2021 | ............. | H04L 41/22 |
| CN | 116662114 | A * | 8/2023 | ............ | G06F 11/302 |

(Continued)

*Primary Examiner* — Hamza N Algibhah
(74) *Attorney, Agent, or Firm* — Lee & Hayes, P.C.

(57) ABSTRACT

Techniques for introducing Open Telemetry (OTEL) into the operating system (OS) level of network devices are described. A method for performing OTEL network device management may include receiving, by a network device, a first packet. The method may also include identifying, by the network device, that the first packet contains information indicating an active OTEL trace, wherein the OS of the network device is configured for OTEL. The method may also include generating, by the network device, an OTEL trace span associated with the network device. The method may also include generating, by the network device, a second packet that includes the OTEL trace span associated with the network device. Finally, the method may include transmitting, by the network device and via OTEL line protocol (OTLP) the second packet to an OTEL collector.

20 Claims, 6 Drawing Sheets

(56)     References Cited

U.S. PATENT DOCUMENTS

2025/0310329 A1 * 10/2025 Lim .................... H04L 63/1416

FOREIGN PATENT DOCUMENTS

| CN | 116800647 | A | * | 9/2023 | ............. H04L 43/10 |
| CN | 116847221 | A | | 10/2023 | |
| CN | 117076250 | A | | 11/2023 | |
| CN | 120104466 | A | * | 6/2025 | .......... G06F 11/3636 |
| EP | 4538893 | A1 | * | 4/2025 | .......... G06F 11/3466 |
| IL | 310284 | A | * | 8/2025 | |
| JP | 2025072796 | A | * | 5/2025 | |
| WO | WO-2017058908 | A1 | * | 4/2017 | .......... H04L 45/033 |

* cited by examiner

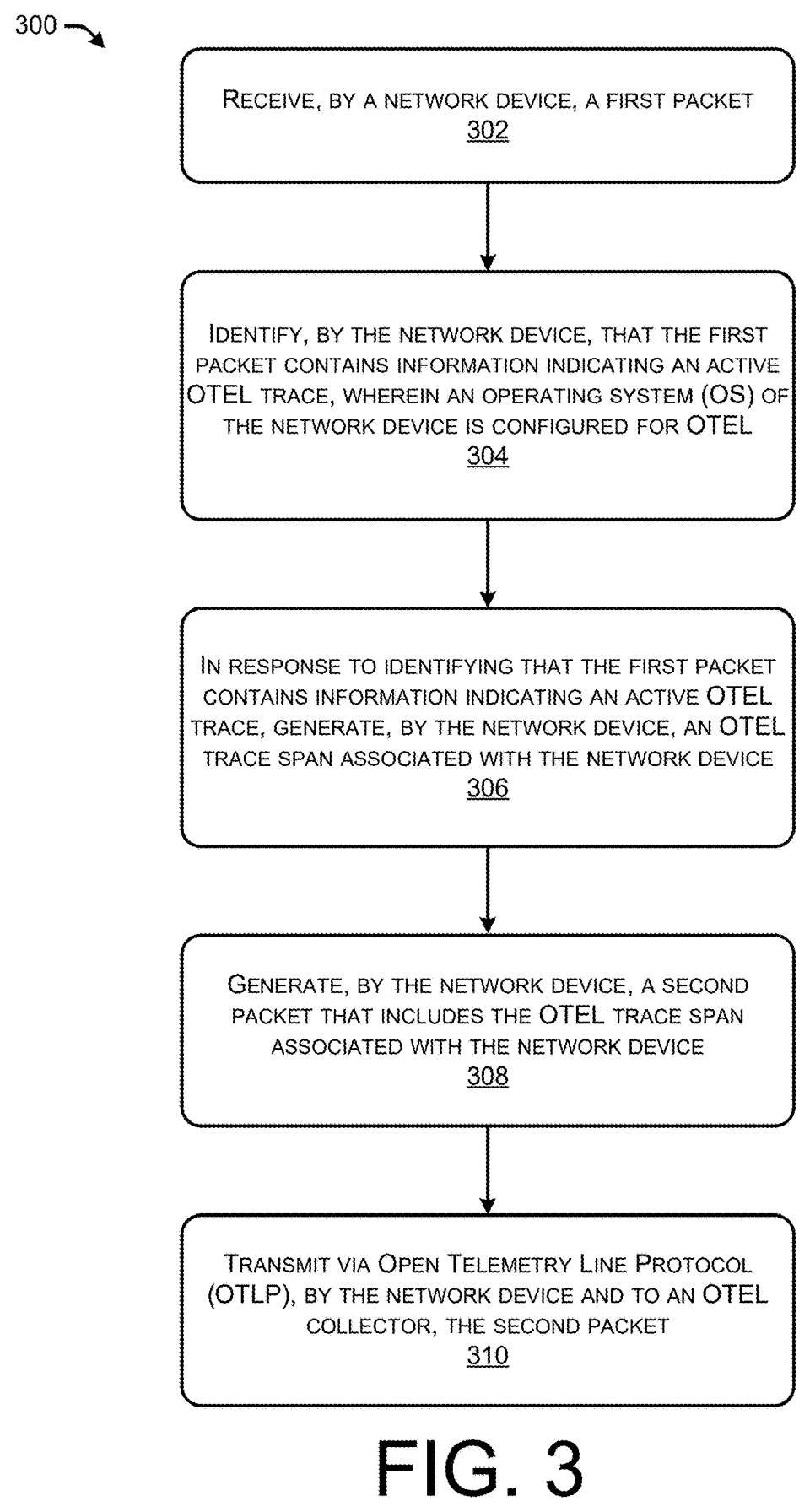

300

RECEIVE, BY A NETWORK DEVICE, A FIRST PACKET
302

IDENTIFY, BY THE NETWORK DEVICE, THAT THE FIRST PACKET CONTAINS INFORMATION INDICATING AN ACTIVE OTEL TRACE, WHEREIN AN OPERATING SYSTEM (OS) OF THE NETWORK DEVICE IS CONFIGURED FOR OTEL
304

IN RESPONSE TO IDENTIFYING THAT THE FIRST PACKET CONTAINS INFORMATION INDICATING AN ACTIVE OTEL TRACE, GENERATE, BY THE NETWORK DEVICE, AN OTEL TRACE SPAN ASSOCIATED WITH THE NETWORK DEVICE
306

GENERATE, BY THE NETWORK DEVICE, A SECOND PACKET THAT INCLUDES THE OTEL TRACE SPAN ASSOCIATED WITH THE NETWORK DEVICE
308

TRANSMIT VIA OPEN TELEMETRY LINE PROTOCOL (OTLP), BY THE NETWORK DEVICE AND TO AN OTEL COLLECTOR, THE SECOND PACKET
310

FIG. 3

OPEN TELEMETRY ENABLED NETWORK DEVICE MANAGEMENT

TECHNICAL FIELD

The present disclosure relates generally to techniques for introducing Open Telemetry (OTEL) into the operating system (OS) level of network devices either in containers or native to generate OTEL metric, events, logs, and traces (MELT) and export the MELT to an OTEL collector present in a network controller which may export the MELT signals to a cloud-based observability system.

BACKGROUND

In today's networking environment, holistically viewing, or monitoring and observing a real-time status of each technology component distributed in an IT environment is a important. By practicing both network observability and network monitoring, network enterprises can proactively manage their network infrastructure, optimize network performance, efficiently troubleshoot issues, and enhance security. Network monitoring and observability provide a holistic approach to network management, enabling network enterprises to maintain reliable, secure, and high-performing network environments. Network monitoring and observability includes various techniques and tools to collect, transfer, analyze, and interpret telemetry data from multiple sources within a network. An increasingly common tool used to assist in monitoring and observability of applications and their software infrastructure is Open Telemetry (OTEL). OTEL is an opensource framework for creating and managing application telemetry data including metrics, logs, and traces. OTEL is focused on the generation, collection, management, and export of telemetry data from applications to various backend platforms. OTEL provides tools, Software Development Kits (SDKs) integrations, and Application Programming Interfaces (APIs) that enable vendor and tool agnostic implementation, enabling telemetry data to be sent to existing monitoring and tracing systems backends. OTEL provides a standard for adding observability instrumentation to cloud-native applications. Thus, enterprises can spend less time developing a mechanism for collecting critical application data and more time delivering new features instead. Additionally, enterprises can control their data since they are not locked into any one vendor or their proprietary agents.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 is a flow diagram illustrating an example method associated with the techniques described herein measuring relative network performance in redundant networks in real time.

DESCRIPTION OF EXAMPLE EMBODIMENTS

Overview

Figure 1:
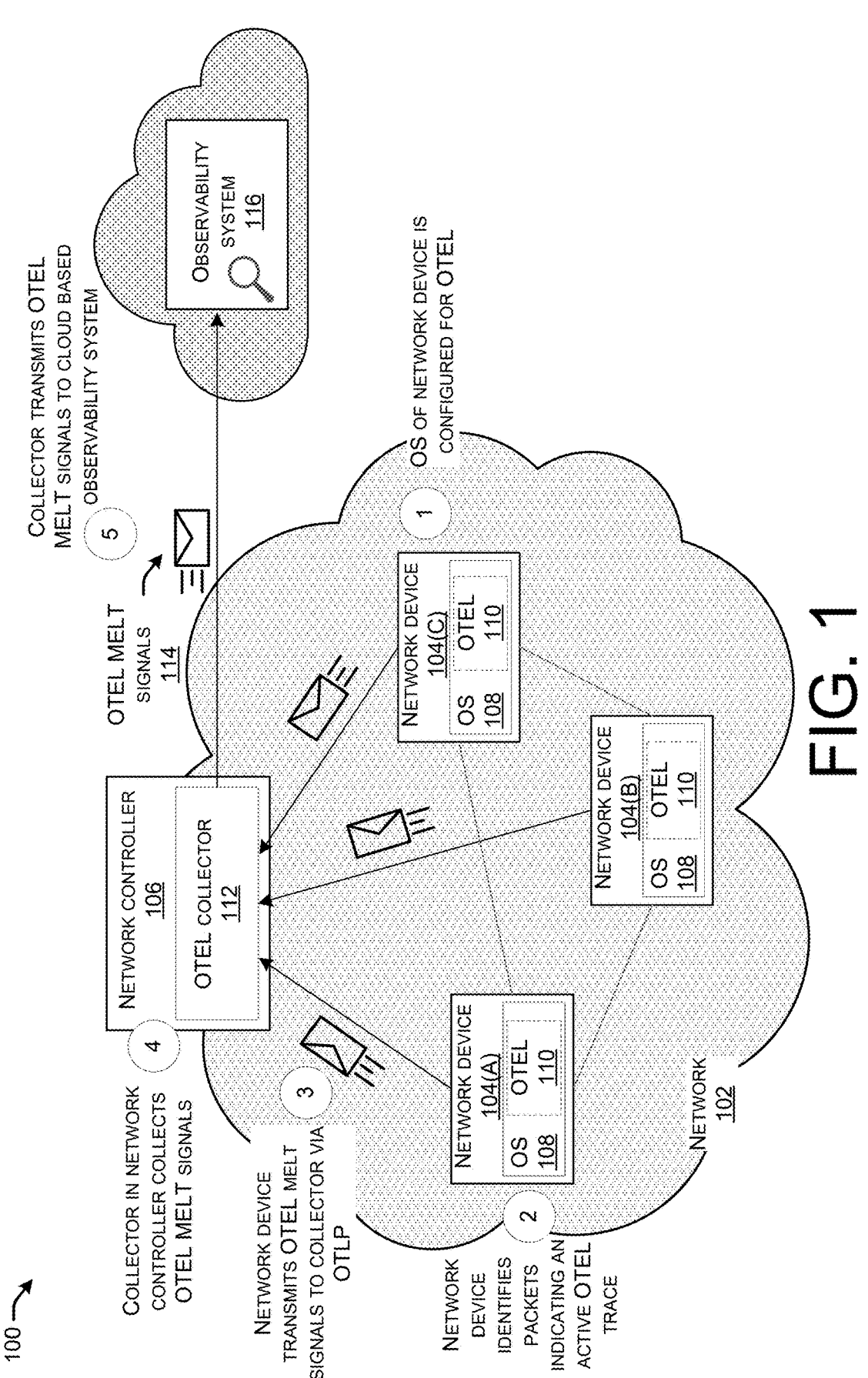
FIG. 1 illustrates an example environment that may implement various aspects of the technologies directed to introducing Open Telemetry into the operating system level of network device either in containers or native.

This disclosure describes a method for performing Open Telemetry (OTEL) network device management, that includes, receiving, by a network device, a first packet. The method may also include identifying, by the network device, that the first packet contains information indicating an active OTEL trace, wherein an Operating System (OS) of the network device is configured for OTEL. In response to identifying that the first packet contains information indicating an active OTEL trace, the method also includes generating, by the network device, an OTEL trace span associated with the network device. The method may also include generating, by the network device, a second packet that includes the OTEL trace span associated with the network device. Also, the method may include transmitting via Open Telemetry Line Protocol (OTLP), by the network device and to an OTEL collector, the second packet. In some examples, the OTEL collector resides in a network controller and is configured to export the OTEL MELT signals to an observability system. In some instances, the OTEL collector exports the OTEL MELT signals to a cloud-based observability system. In some implementations, OTEL is native to the OS, and the in other implementations, OTEL is enabled in the network device via a container. In various examples, the OS of the network device is configured for streamlining OTEL via OTLP absent an OTEL Software Development Kit (SDK) and Application Programming Interface (API). Finally, in some examples, identifying that the first packet contains information indicating an active OTEL trace further comprises detecting a W3C propagation header in the first packet.

Additionally, the techniques described herein may be performed by a system and/or device having non-transitory computer-readable media storing computer-executable instructions that, when executed by one or more processors, performs the method described above.

Example Embodiments

As described above, in today's networking environment, holistically viewing, or monitoring and observing a real-time status of each technology component distributed in an IT environment is a must. To that end, Open Telemetry (OTEL) provides a single, open-source standard, and a set of technologies to capture and export Metrics, Events, Logs, and Traces (MELT) from cloud-native applications. OTEL provides a consistent format for instrumenting, generating, gathering, and exporting application telemetry data to monitoring platforms for storage and analysis. OTEL consists of vendor-agnostic open-source tools, Application Programming Interfaces (APIs), and Software Development Kits (SDKs) that can be implemented with a variety of programming languages. These tools work together to specify what is to be measured, gathers the relevant data, and exports it in the appropriate format to a monitoring backend. Thus, an important aspect of OTEL for applications, are the APIs and SDKs. The APIs instrument the code and coordinate data collection across the system. APIs are language-specific, so the APIs used have to match whatever language the application code is in. SDKs implement and support APIs via libraries that help with data gathering, processing, and exports. Similar to the OTEL APIs, SDKs are also language specific, and the SDKs have to match the application language. Thus, as most applications are in commonly used languages, there are various OTEL APIs and SDKs available for use with most application software. However, APIs and SDKs do not exist for proprietary network device Operating Systems (OSs). Thus, OTEL cannot simply be used with network devices, unless the network device telemetry is somehow converted from its native format to OTEL, which can be cumbersome, expensive, and time consuming. An example of this may be converting NetFlow data format to OTEL native format. However, this is difficult, requires conversion tools, and is complicated, expensive, and time consuming. Thus, as more and more aspects of the networking world are moving to OTEL, there is a need to seamlessly integrate OTEL with network devices.

This disclosure is directed to techniques for introducing Open Telemetry to network devices into the OS level either in containers or native. The network devices directly generate the OTEL MELT signals and export them via OTLP directly to an OTEL collector with no need for OTEL APIs or SDKs. In some instances, the network devices can identify network traffic that contains information indicating an active OTEL trace. For example, the network device may identify a predetermined trigger phrase in a packet header. As an example, a network device may recognize the W3C Propagation Header in a packet. This indicates to the network device that a trace is active. The network device may recognizes the W3C propagation header, inserts a child span using information from the context propagation and then inject the network device into the active trace. The network device can then send the packet injected with the network device trace span, via OTLP to an OTEL collector. In other instances, metrics, logs and events signals can be generated by the network device and sent directly from the network device, via OTLP to an OTEL collector. In some examples, the OTEL collector would reside in a network controller or network controller manager. Note, network controller is used herein to describe that which orchestrates a networks functions, however network controller is used by example and not limitation, network controller manager, network orchestrator, network manager, etc. may all be used as appropriate to describe that which orchestrates network functions. The network controller OTEL collector would export the OTEL MELT signals received from its network devices to a cloud-based observability system (e.g., Splunk Observability Cloud). The OTEL MELT signals are sent from the network devices in a network to the OTEL collector that resides in the network controller via Open Telemetry Line Protocol (OTLP). OTLP is the wire protocol for sending MELT signals and is used to move data from the collection point to an OTEL collector or receiver. In some examples, OTLP is basically a JavaScript Object Notation (JSON) based content sent via Hypertext Transfer Protocol Secure (HTTPS).

The OTEL collector, residing in the network controller, acts like an inline proxy. The OTEL collector consolidates MELT signals from multiple agents and can process and retransform between signals (e.g., Span Metrics). OTEL collectors contain "receivers" for receiving OTEL MELT signals and "exporters" for exporting the collected signals from multiple network devices to a backend, such as the cloud-based observability system Splunk Observability Cloud. Splunk Observability Cloud is used herein as an example of a backend observability system and is not meant to be limiting. The techniques described herein for introducing OTEL to the OS level of a network device may be used with any appropriate observability backend. The observability backend includes a receiver for receiving the MELT signals for final storage and analysis. The observability backend may also receive MELT signals from multiple network controllers with OTEL collectors residing in them.

The lack of tools, APIs, and SDKs for implementing OTEL in the networking world has conventionally prevented network devices from utilizing OTEL and the many benefits OTEL provides, such as having a "single pane of glass" monitoring solution which is highly sought after by IT operations. As Full Stack Observability (FSO) rapidly moves towards OTEL based monitoring solutions on applications and their software infrastructure, the techniques described herein will allow network devices to also incorporate OTEL even absent APIs and SDKs, as APIs and SDKs do not exist for proprietary network device operating systems.

FIG. 1 illustrates an example environment 100 that may implement various aspects of the technologies directed to introducing Open Telemetry (OTEL) into the operating system (OS) level of network devices either in containers or native to generate OTEL Metric, Events, Logs, and Traces (MELT) and export the MELT signals to an OTEL collector present in a network controller that receives OTEL MELT signals from multiple network devices and may export the OTEL MELT signals to a cloud-based observability system. Network 102 may be any appropriate type of network that includes multiple devices linked together for facilitating data communication, (e.g., LAN, WAN, etc.). Network 102 may be a network fabric that includes multiple different network devices 104. Network devices 104 may be a combination of network devices such as switches, bridges, routers, firewalls, repeaters, gateways, hubs, access points, and the like. Network 102 is an example network, and any particular network may include more of less network devices of various kinds. In example environment 100, network 102 includes network device 104(A), network device 104(B), and network device 104(C). As an example, network 102 may be a Software Defined Wide Area Network (SDWAN) that includes a network controller 106 that provides a centralized, programmable point of automation that can manage, configure, monitor, and troubleshoot virtual network infrastructure. Network controller 106 communicates with and manages the network devices 104 that make up the fabric of network 102. For example, network controller 106 may instruct the network devices 104 to implement OTEL. In other words, the network devices 104 receive OTEL configuration from the network controller 106. Essentially, network controller 106 may be a network controller manager from which the network device 104 receive OTEL configuration information.

The network devices 104 of network 102 each include an Operating System (OS) 108. Typically, the OS 108 of a network device 104 is proprietary. Thus, there are no readily available Open Telemetry (OTEL) tools, Software Development Kits (SDKs), and Application Programming Interfaces (APIs) for implementing OTEL with network devices

104. Thus, the network devices in example environment 100 include OTEL capabilities either native to the OS 108 or in a container as shown at OTEL 110. Thus, the network devices 104 can generate OTEL Metrics, Events, Logs, and Traces, and stream straight Open Telemetry Line Protocol (OTLP) to transmit the OTEL MELT signals to an OTEL collector. In some examples, the network devices 104 can generate metric, event, and log signals and send the signals, via OTLP to an OTEL collector. In another example, when a network device 104 receives a packet, the network device 104 may look for an OTEL trigger that indicates the packet contains information indicating an active OTEL trace, such as an indication in a header, for example a W3C propagation header, that will trigger the network device 104 to create a child span using information from the context propagation contained in the packet. If the packet does contain the trigger, the network device 104 may inject the network device 104 into the trace. Essentially, the network device 104 creates a trace span for itself to add to the OTEL information because the network device 104 is configured at the OS level for OTEL. The network device will then transmit the W3C context propagation to the next network device, as well as send its own trace span, via OTLP to the OTEL collector 112.

In example environment 100 an OTEL collector 112 resides in the network controller 106. The OTEL collector 112 collects OTEL MELT signals 114, transmitted via OTLP, from network device 104(A), network device 104(B), and network device 104(C) as shown. The OTEL collector 112 collects this information in transit and exports the OTEL MELT signals 114 to a cloud-based observability system 116 for storage and visualization. The observability system 116 is used to store, process, analyze, and visualize the OTEL MELT signals produced by and collected from the network devices 104.

To implement techniques described herein for introducing Open Telemetry (OTEL) into the operating system (OS) level of network devices either in containers or native to generate OTEL metric, events, logs, and traces (MELT) and export the OTEL MELT signals via Open Telemetry Line Protocol (OTLP) to an OTEL collector present in a network controller which may export the OTEL MELT signals to a cloud-based observability system, at (1) because there are no OTEL tools like SDKs and APIs readily available for proprietary operating systems in the network devices 104, the OSs 108 of the network devices 104 are configured for OTEL. The network devices 104 are configured to generate OTEL metrics, events, and logs and transmit them via OTLP to the OTEL collector 112 of the network controller 106. Additionally, at (2) the network devices 104 is configured to identify packets indicating an active OTEL trace. For example, the network device 104 may look for a predetermined trigger phrase in a packet header such as a W3C propagation header indicating an active OTEL trace. The network device 104 may insert a child span using information from the context propagation and inject the network device 104 into the trace. In addition, at (3) the network devices 104 transmit its OTEL MELT signals to the OTEL collector 112 via OTLP. For example, shown below is code for OTLP metrics data that may be generated and transmitted by the network devices 104. Note the code below is meant to be an example and not limiting, other types of MELT signals may also be transmitted from the network devices 104 to the OTEL collector 112 via OTLP, and code in any other appropriate form may be used to facilitate the techniques described here.

```json
        "attributes": [
          {
            "key": "my.scope.attribute":
            "value": {
              "string Value": "some scope attribute"
            }
          }
        ]
      },
      "metrics": [
        {
          "name": "my.counter":
          "unit": "1":
          "description": "I am a
          Counter": "sum": {
          "aggregationTemporality": 1,
          "isMonotonic": true,
          "dataPoints": [
            {
              "asDouble": 5,
              "startTimeUnixNano": "1544712660300000000":
              "timeUnixNano": "1544712660300000000":
              "attributes": [
                {
                  "key": "my.counter.attr":
                  "value": {
                  "string Value": "some value"
                  }
                }
              ]
            }
          ]
        }
      }
    },
  {
    "name": "my.gauge":
    "unit": "1":
    "description": "I am a Gauge":
    "gauge": {
    "dataPoints": [
      {
        "asDouble": 10,
          "timeUnixNano": "1544712660300000000":
          "attributes": [
            {
              "key": "my.gauge.attr":
          "value": {
          "stringValue": "some value"
              }
            }
          ]
        }
      ]
    }
    ]
    }
  },
  {
    "name": "my.histogram":
    "unit": "1":
    "description": "I am a
    Histogram": "histogram": {
    "aggregationTemporality": 1,
    "dataPoints": [
      {
        startTimeUnixNano": "1544712660300000000":
        "timeUnixNano": "1544712660300000000":
        "count": 2,
        "sum": 2,
        "bucketCounts": [1,1],
        "explicitBounds": [1],
        "min": 0,
        "max": 2,
        "attributes": [
          {
            "key": "my.histogram.attr":
            "value": {
            "string Value": "some value"
            }
          }
        ]
      }
    }
  ]
```

7

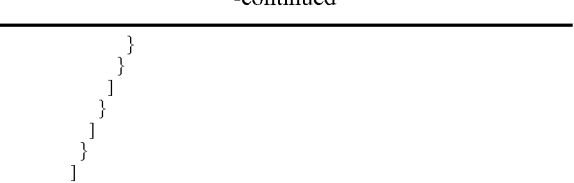

At (4) the OTEL collector collects the OTEL MELT signals 114 sent from the various network devices 104, and acts as a temporary repository for the OTEL MELT signals in transit. At (5) the OTEL collector acts as an exporter, and transmits the OTEL MELT signals 114 to a cloud-based observability system 116 for final storage and analysis. Thus, the process described herein allows for OTEL to be implemented by network devices 104 at an OSs level, either native or in a container, even absent OTEL tools, SDKs, and APIs.

Figure 2:
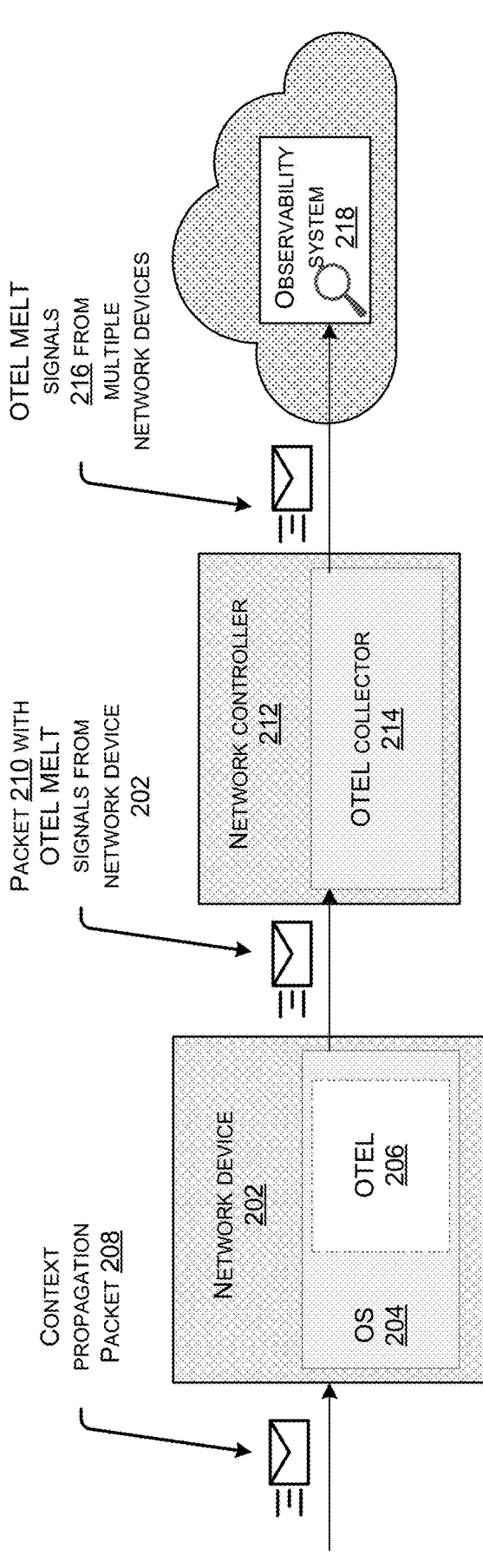
FIG. 2 illustrates the flow of Open Telemetry from network devices to an observability backend.

FIG. 2 illustrates and environment 200 of a flow of Open Telemetry from a host, to a network devices, to an OTEL collector, and finally to an observability backend. Environment 200 includes network device 202. Similar to network device 104 described above with reference to FIG. 1, network device 202 has an OS 204 that is configured for generating OTEL MELT signals and transmitting the OTEL MELT signals via OTLP to an OTEL collector. The OS 204 of network device 202 may be configured for implementing OTEL either natively or the OTEL configuration may reside in a container as shown at OTEL 206 within the OS 204 of network device 202. The network device 202 is configured to identify packets in network traffic that contain information indicating an active OTEL trace, such as context propagation packets. For example, the network device may be configured to identify one or more trigger phrases in a packet header (e.g., a W3C header) that indicate the packet contains information indicating an active OTEL trace. The network device may alter the information in the identified packet, for example by inserting a child span using information from the context propagation and injecting the network device 202 itself into the trace. Additionally, network device 202 is configured to generate OTEL metrics, events, and logs, and to transmit the packets 210 with these OTEL MELT signals associated with network device 202 to an OTEL collector that resides in a network controller. Additionally, when the network device 202 identifies the packet 208 containing information indicating an active OTEL trace, network device 202 generates a child trace span associated with network device 202, and transmits a packet 210 that includes the OTEL trace span associated with the network device 202 to the OTEL collector 214 residing in the network controller 212. As illustrated network controller 212 contains an OTEL collector 214. The network controller 212 and OTEL collector 214 may correspond to network controller 106 that contains OTEL collector 112 as described above with reference to FIG. 1. The OTEL collector 214 acts as a temporary repository of OTEL MELT signals in transit from the network device 202 to an observability backend. The OTEL collector 214 collects OTEL MELT signals from multiple network devices and sends the packet 216 with OTEL MELT signals from multiple network devices to an observability system 218. The observability system may be a cloud-based observability system for storage and visualization, such as Splunk Observability Cloud. The observability system 218 is used to store, process, analyze, and visualize the OTEL MELT signals produced by and collected from the network device 202. The observability system 218 may correspond to the observability system 116 described above with reference to FIG. 1. The flow of Open Telemetry through network devices to an observability backend as illustrated in FIG. 2 is facilitated absent conventional OTEL tool such as SDKs and APIs as the network device 202 is configured at the operating system level to generate OTEL MELT signals, incorporate its own OTEL trace span, and generate OTLP to transmit the OTEL MELT signals to an OTEL collector that resides in the network controller, which is configured to then export the OTEL MELT signals to an observability backend.

FIG. 3 is a flow diagram illustrating an example method 300 associated with the techniques described herein for introducing Open Telemetry (OTEL) into the operating system (OS) level of network devices either in containers or native to generate OTEL Metric, Events, Logs, and Traces (MELT) signals and export the MELT signals to an OTEL collector present in a network controller which may export the MELT signals to a cloud-based observability system. Example method 300 illustrates aspects of the functions performed by network device(s) 104 as described with reference to FIG. 1 and network device 202 as described with reference to FIG. 2. The logical operations described herein with respect to FIG. 3 may be implemented (1) as a sequence of computer-implemented acts or program modules running on a computing system and/or (2) as interconnected machine logic circuits or circuit modules within the computing system. In some examples, the method(s) 300 may be performed by a system comprising one or more processors and one or more non-transitory computer-readable media storing computer-executable instructions that, when executed by the one or more processors, cause the one or more processors to perform the method(s) 300.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 302 a network device, receives a first packet. For example, with reference to FIG. 2 the network device 202 receives the context propagation packet 208.

At operation 304, the network device identifies that the first packet contains information indicating an active OTEL trace, wherein the Operating System (OS) of the network device is configured for OTEL. For example, with reference to FIG. 1, the network devices 104 are configured to generate and stream OTEL MELT signals at (1). With reference to FIG. 2 the network device 202 is configured for OTEL and identifies the context propagation packet 208 with information indicating an active OTEL trace. For example, network device 202 may recognize one or more predetermine trigger phrases in the packet header. For example, network device 202 may recognize a W3C propagation header in context propagation packet 208.

At operation 306, in response to identifying that the first packet contains information indicating an active OTEL trace, the network device generates an OTEL trace span associated with the network device. For example, with reference to FIG. 1, because network device 104 is configured for OTEL, the network device 104 identifies packets indicating an active OTEL trace at (2), and in response, the network device 104 generates an OTEL trace span associated with network device 104.

At operation 308, the network device generates a second packet that includes the OTEL trace span associated with the network device. For example, with reference to FIG. 1 at (3) the network device 104 generates a second packet, the second packet includes the OTEL trace span associated with network device 104. With reference to FIG. 2 network device 202 generates packet 210 that includes the OTEL trace span associated with network device 202.

At operation 310 the network device transmits, via Open Telemetry Line Protocol (OTLP), the second packet to an OTEL collector. For examples, with reference to FIG. 1 the network devices 104 transmit the OTEL MELT signals 114 via OTLP to OTEL collector 112 that resides in network controller 106. OTEL collector 112 then transmits the OTEL MELT signals 114 to a cloud-based observability system 116. In another example with reference to FIG. 2 network device 202 transmits packet 210 via OTLP to the OTEL collector 214 that resides in network controller 212. OTEL collector 214 may then transmit packets 216 with OTEL MELT signals from multiple network devices to observability system 218. Thus, example method 300 illustrates the process by which OTEL may be integrated into the OS of a network device with the need for SDKs and APIs for the proprietary OS system present in the network device. This example method incorporates the use of OTEL from end to end of a network path, because the network devices are configured for OTEL. Conventionally, because network devices have proprietary operating systems, the network fabric, from device to device, was excluded from OTEL.

Figure 4:
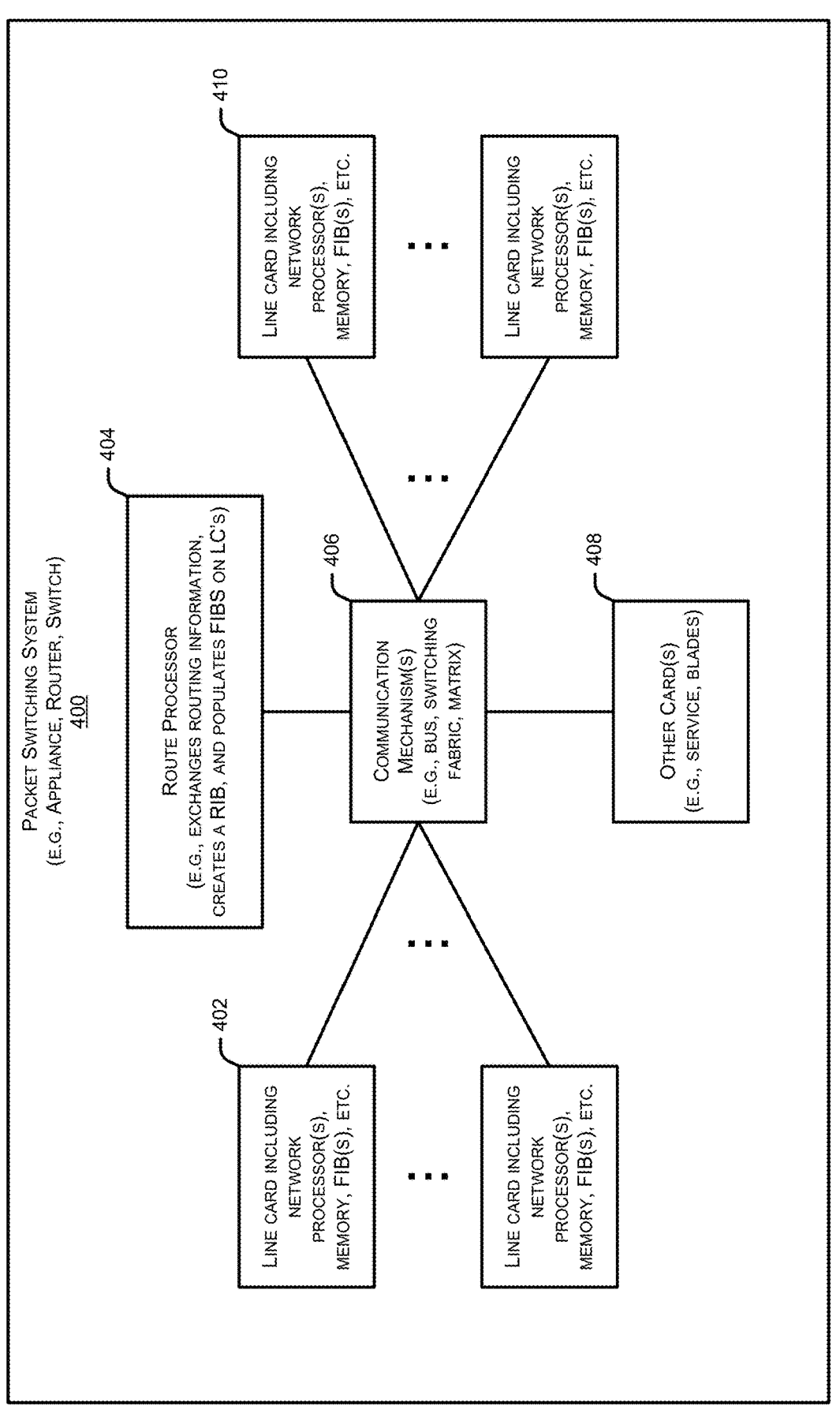
FIG. 4 illustrates a block diagram illustrating an example packet switching system that can be utilized to implement various aspects of the technologies disclosed herein.

FIG. 4 illustrates a block diagram illustrating an example packet switching device (or system) 400 that can be utilized to implement various aspects of the technologies disclosed herein. In some examples, packet switching device(s) 400 may be employed in various networks, such as, for example, network 102 described with respect to FIG. 1.

In some examples, a packet switching system 400 may comprise multiple line card(s) 402, 410, each with one or more network interfaces for sending and receiving packets over communications links (e.g., possibly part of a link aggregation group). The packet switching system 400 may also have a control plane with one or more processing elements for managing the control plane and/or control plane processing of packets associated with forwarding of packets in a network. The packet switching system 400 may also include other cards 408 (e.g., service cards, blades) which include processing elements that are used to process (e.g., forward/send, drop, manipulate, change, modify, receive, create, duplicate, apply a service) packets associated with forwarding of packets in a network. The packet switching system 400 may comprise hardware-based communication mechanism 406 (e.g., bus, switching fabric, and/or matrix, etc.) for allowing its different entities, line cards 402, 404, 408 and 410 to communicate. Line card(s) 402, 410 may typically perform the actions of being both an ingress and/or an egress line card 402, 410, in regard to multiple other particular packets and/or packet streams being received by, or sent from, packet switching system 400.

Figure 5:
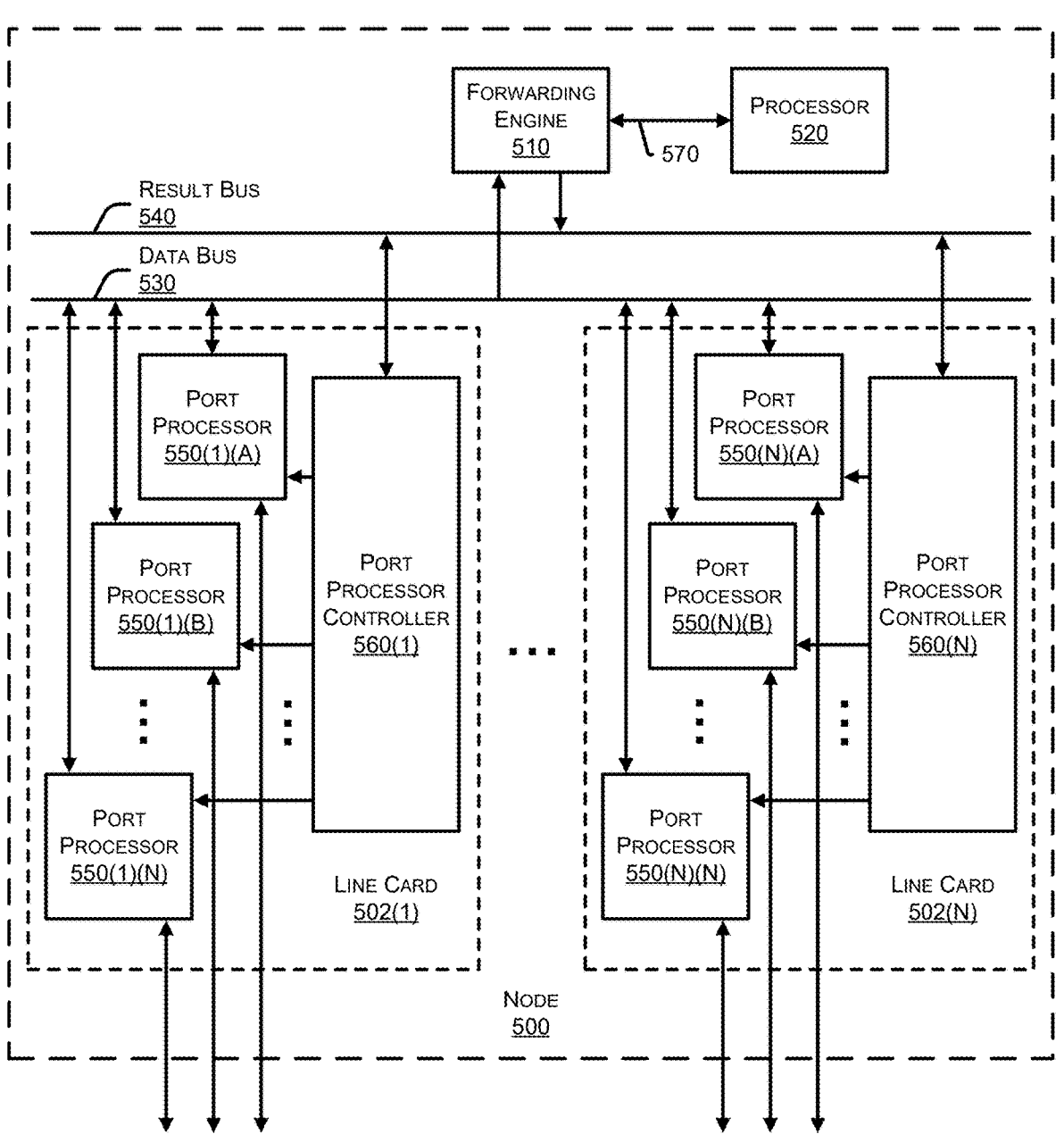
FIG. 5 illustrates a block diagram illustrating certain components of an example node that can be utilized to implement various aspects of the technologies disclosed herein.

FIG. 5 illustrates a block diagram illustrating certain components of an example node 500 that can be utilized to implement various aspects of the technologies disclosed herein. In some examples, node(s) 500 may be network devices such as network devices(s) 104 employed in various networks, such as, for example network 102 as described with respect to FIG. 1.

In some examples, node 500 may include any number of line cards 502 (e.g., line cards 502(1)-(N), where N may be any integer greater than 1) that are communicatively coupled to a forwarding engine 510 (also referred to as a packet forwarder) and/or a processor 520 via a data bus 530 and/or a result bus 540. Line cards 502(1)-(N) may include any number of port processors 550(1)(A)-(N)(N) which are controlled by port processor controllers 560(1)-(N), where N may be any integer greater than 1. Additionally, or alternatively, forwarding engine 510 and/or processor 520 are not only coupled to one another via the data bus 530 and the result bus 540, but may also communicatively coupled to one another by a communications link 570.

The processors (e.g., the port processor(s) 550 and/or the port processor controller(s) 560) of each line card 502 may be mounted on a single printed circuit board. When a packet or packet and header are received, the packet or packet and header may be identified and analyzed by node 500 (also referred to herein as a router) in the following manner. Upon receipt, a packet (or some or all of its control information) or packet and header may be sent from one of port processor(s) 550(1)(A)-(N)(N) at which the packet or packet and header was received and to one or more of those devices coupled to the data bus 530 (e.g., others of the port processor(s) 550(1)(A)-(N)(N), the forwarding engine 510 and/or the processor 520). Handling of the packet or packet and header may be determined, for example, by the forwarding engine 510. For example, the forwarding engine 510 may determine that the packet or packet and header should be forwarded to one or more of port processors 550(1)(A)-(N)(N). This may be accomplished by indicating to corresponding one(s) of port processor controllers 560(1)-(N) that the copy of the packet or packet and header held in the given one(s) of port processor(s) 550(1)(A)-(N)(N) should be forwarded to the appropriate one of port processor(s) 550(1)(A)-(N)(N). Additionally, or alternatively, once a packet or packet and header has been identified for processing, the forwarding engine 510, the processor 520, and/or the like may be used to process the packet or packet and header in some manner and/or may add packet security information in order to secure the packet. On a node 500 sourcing such a packet or packet and header, this processing may include, for example, encryption of some or all of the packets or packet and header's information, the addition of a digital signature, and/or some other information and/or processing capable of securing the packet or packet and header. On a node 500 receiving such a processed packet or packet and header, the corresponding process may be performed to recover or validate the packets or packet and header's information that has been secured.

Figure 6:
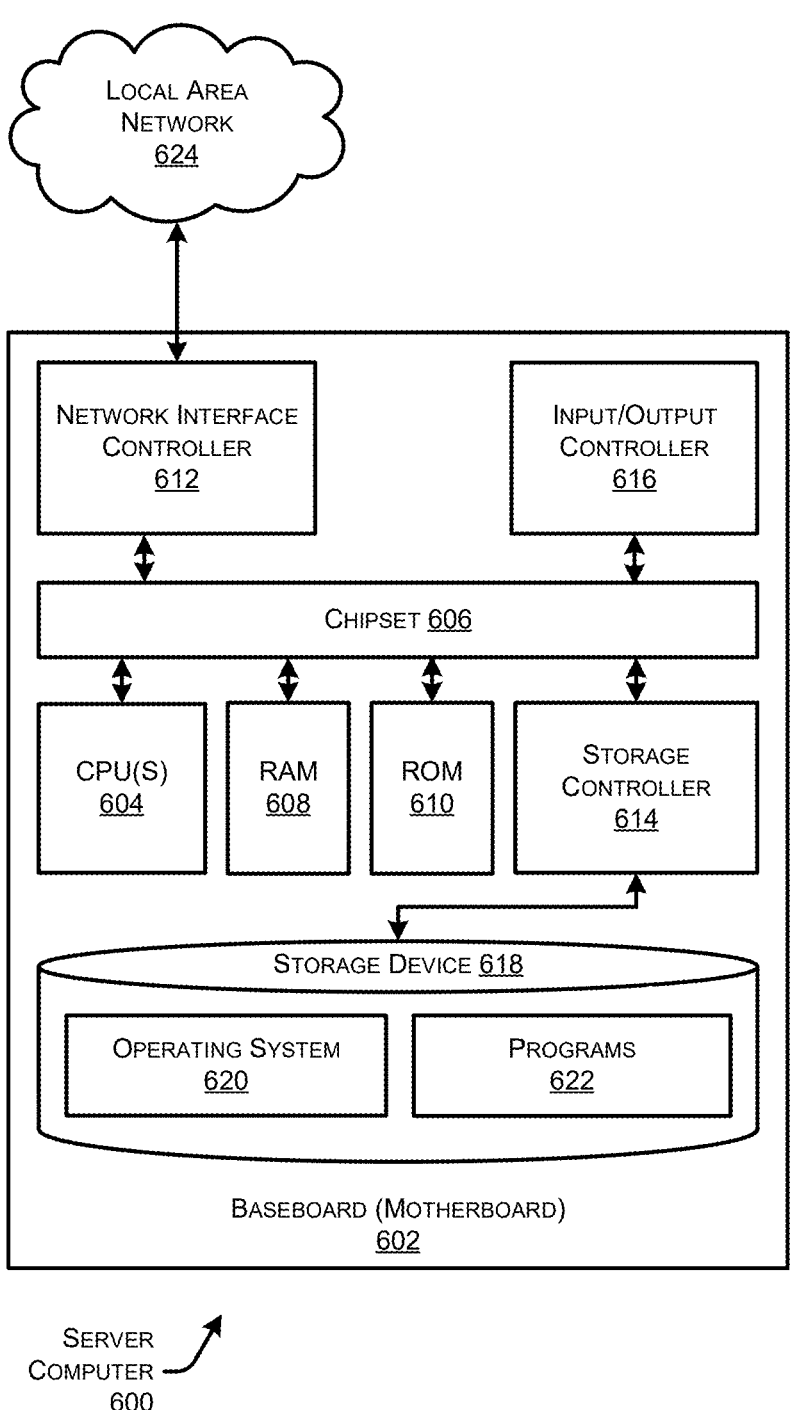
FIG. 6 is a computer architecture diagram showing an illustrative computer hardware architecture for implementing a server device that can be utilized to implement aspects of the various technologies presented herein.

FIG. 6 shows an example computer architecture for a computing device (or network routing device) 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The computing device 600 may, in some examples, correspond to a network device such as network device 104, network controller 106, network device 202, network controller 212, the packet switching system 400, and/or the node 500 described herein with respect to FIGS. 1, 2, 4 and 5, respectively.

The computing device 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 600. The chipset 606 can further provide an interface to a computer-readable storage medium such as a read-only memory ("ROM") 610 or non-volatile RAM ("NVRAM") for storing basic routines that help to start up the computing device 600 and to transfer information between the various components and devices. The ROM 610 or NVRAM can also store other software components necessary for the operation of the computing device 600 in accordance with the configurations described herein.

The computing device 600 can operate in a networked environment using logical connections to remote computing devices and computer systems through a network, such as the network 624. Network 624 may, in some examples, correspond to network 102 of FIG. 1. The chipset 606 can include functionality for providing network connectivity through a NIC 612, such as a gigabit Ethernet adapter. The NIC 612 is capable of connecting the computing device 600 to other computing devices over the network 624. It should be appreciated that multiple NICs 612 can be present in the computing device 600, connecting the computer to other types of networks and remote computer systems.

The computing device 600 can be connected to a storage device 618 that provides non-volatile storage for the computing device 600. The storage device 618 can store an operating system 620, programs 622, and data, which have been described in greater detail herein. The storage device 618 can be connected to the computing device 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 can further read information from the storage device 618 by detecting the physical states or characteristics of one or more particular locations within the physical storage units.

In addition to the mass storage device 618 described above, the computing device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 600. In some examples, the operations performed by network device(s) 104, network device 202, network controller 106, network controller 212, and/or any components included therein, may be supported by one or more devices similar to computing device 600. Stated otherwise, some or all of the operations performed by network device(s) 104, network device 202, network controller 106, network controller 212, or any components included therein, may be performed by one or more computing device 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 600.

In one embodiment, the storage device 618 or other computer-readable storage media is encoded with computer-executable instructions which, when loaded into the computing device 600, transform the computer from a general-purpose computing system into a special-purpose computer capable of implementing the embodiments described herein. These computer-executable instructions transform the computing device 600 by specifying how the CPUs 604 transition between states, as described above. According to one embodiment, the computing device 600 has access to computer-readable storage media storing computer-executable instructions which, when executed by the computing device 600, perform the various processes described above with regard to FIG. 6. The computing device 600 can also include computer-readable storage media having instructions stored thereupon for performing any of the other computer-implemented operations described herein.

The computing device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat panel display, a digital projector, a printer, or other type of output device. It will be appreciated that the computing device 600 might not include all of the components shown in FIG. 6, can include other components that are not explicitly shown in FIG. 6, or might utilize an architecture completely different than that shown in FIG. 6.

While the techniques described herein are described with respect to the specific examples, it is to be understood that the scope of the techniques are not limited to these specific examples. Since other modifications and changes varied to fit particular operating requirements and environments will be apparent to those skilled in the art, the techniques are not considered limited to the example chosen for purposes of disclosure, and covers all changes and modifications which do not constitute departures from the true spirit and scope of the techniques described herein.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for performing Open Telemetry (OTEL) network device management, the method comprising: receiving, by a network device, a first packet; identifying, by the network device, that the first packet contains information indicating an active OTEL trace, wherein an Operating System (OS) of the network device is configured for OTEL; in response to identifying that the first packet contains information indicating an active OTEL trace, generating, by the network device, an OTEL trace span associated with the network device; generating, by the network device, a second packet that includes the OTEL trace span associated with the network device; and transmitting via Open Telemetry Line Protocol (OTLP), by the network device and to an OTEL collector, the second packet.

2. The method of claim 1, wherein the OTEL collector resides in a network controller and is configured to export OTEL MELT signals to an observability system.

3. The method of claim 1, wherein the OTEL collector exports OTEL MELT signals to a cloud-based observability system.

4. The method of claim 1, wherein OTEL is native to the OS of the network device.

5. The method of claim 1, wherein OTEL is enabled in the network device via a container.

6. The method of claim 1, wherein the OS of the network device is configured for OTEL via OTLP absent an OTEL software development kit (SDK) and application programming interface (API).

7. The method of claim 1, wherein identifying that that the first packet contains information indicating an active OTEL trace further comprises detecting a W3C propagation header in the first packet.

8. A system comprising: one or more processors; and one or more non-transitory computer-readable media storing computer-executable instructions that, when executed by the one or more processors, cause the one or more processors to perform operations comprising: receiving, by a network device, a first packet; identifying, by the network device, that the first packet contains information indicating an active OTEL trace, wherein an Operating System (OS) of the network device is configured for OTEL; in response to identifying that the first packet contains information indicating an active OTEL trace, generating, by the network device, an OTEL trace span associated with the network device; generating, by the network device, a second packet that includes the OTEL trace span associated with the network device; and transmitting via Open Telemetry Line Protocol (OTLP), by the network device and to an OTEL collector, the second packet.

9. The system of claim 8, wherein the OTEL collector resides in a network controller and is configured to export OTEL MELT signals to an observability system.

10. The system of claim 8, wherein the OTEL collector exports OTEL MELT signals to a cloud-based observability system.

11. The system of claim 8, wherein OTEL is native to the OS of the network device.

12. The system of claim 8, wherein OTEL is enabled in the network device via a container.

13. The system of claim 8, wherein the OS of the network device is configured for OTEL via OTLP absent an OTEL software development kit (SDK) and application programming interface (API).

14. The system of claim 8, wherein identifying that that the first packet contains information indicating an active OTEL trace further comprises detecting a W3C propagation header in the first packet.

15. One or more non-transitory computer-readable media storing instructions that, when executed, cause one or more processors to perform operations comprising: receiving, by a network device, a first packet; identifying, by the network device, that the first packet contains information indicating an active OTEL trace, wherein an Operating System (OS) of the network device is configured for OTEL; in response to identifying that the first packet contains information indicating an active OTEL trace, generating, by the network device, an OTEL trace span associated with the network device; generating, by the network device, a second packet that includes the OTEL trace span associated with the network device; and transmitting via Open Telemetry Line Protocol (OTLP), by the network device and to an OTEL collector, the second packet.

16. The one or more non-transitory computer-readable media of claim 15, wherein the OTEL collector resides in a network controller and is configured to export OTEL MELT signals to an observability system.

17. The one or more non-transitory computer-readable media of claim 15, wherein the OTEL collector exports OTEL MELT signals to a cloud-based observability system.

18. The one or more non-transitory computer-readable media of claim 15, wherein the OTEL collector exports OTEL MELT signals to a cloud-based observability system.

19. The one or more non-transitory computer-readable media of claim 15, wherein OTEL is enabled in the network device via a container.

20. The one or more non-transitory computer-readable media of claim 15, wherein identifying that that the first packet contains information indicating an active OTEL trace further comprises detecting a W3C propagation header in the first packet.

\* \* \* \* \*